US012249857B2

(12) United States Patent
Chen (10) Patent No.: US 12,249,857 B2
(45) Date of Patent: Mar. 11, 2025

(54) ELECTRIC ENERGY MANAGEMENT SYSTEM WITH THERMOELECTRIC POWER SUPPLY CONVERSION FUNCTION

(71) Applicant: Lee Fei Chen, Taipei (TW)

(72) Inventor: Lee Fei Chen, Taipei (TW)

( * ) Notice: Subject to any disclaimer, the term of this patent is extended or adjusted under 35 U.S.C. 154(b) by 730 days.

(21) Appl. No.: 17/574,736

(22) Filed: Jan. 13, 2022

(65) Prior Publication Data

US 2023/0223770 A1    Jul. 13, 2023

(51) Int. Cl.
*H02J 7/00* (2006.01)
*H01M 10/48* (2006.01)
*H01M 10/6572* (2014.01)

(52) U.S. Cl.
CPC ....... *H02J 7/00309* (2020.01); *H01M 10/482* (2013.01); *H01M 10/6572* (2015.04); *H02J 7/00032* (2020.01); *H02J 7/0013* (2013.01)

(58) Field of Classification Search
CPC .. H02J 7/00309; H02J 7/00032; H02J 7/0013; H02J 7/007194; H02J 2300/20; H02J 2300/30; H02J 2300/40; H01M 10/482; H01M 10/6572; H01M 10/486
See application file for complete search history.

(56) References Cited

U.S. PATENT DOCUMENTS

| | | |
|---|---|---|
| 3,635,037 A | 1/1972 | Hubert |
| 4,089,184 A | 5/1978 | Beitner |
| 4,229,687 A | 10/1980 | Newman |
| 4,314,008 A | 2/1982 | Blake |
| 5,229,702 A | 7/1993 | Boehling et al. |
| 5,705,770 A | 1/1998 | Ogasawara et al. |
| 5,871,859 A | 2/1999 | Parise |
| 6,057,050 A | 5/2000 | Parise |
| 6,294,721 B1 | 9/2001 | Oravetz et al. |
| 6,345,507 B1 | 2/2002 | Gillen |
| 6,455,186 B1 | 9/2002 | Moores, Jr. et al. |
| 6,580,025 B2 | 6/2003 | Guy |
| 6,645,666 B1 | 11/2003 | Moores, Jr. et al. |
| 6,651,446 B1 | 11/2003 | Woods |
| 6,891,353 B2 | 5/2005 | Tsukamoto et al. |
| 6,949,309 B2 | 9/2005 | Moores, Jr. et al. |
| 6,955,055 B2 | 10/2005 | Ebermann |

(Continued)

*Primary Examiner* — David V Henze-Gongola
(74) *Attorney, Agent, or Firm* — Best & Flanagan LLP (57) ABSTRACT

An electric energy management system with thermoelectric power supply conversion function includes a controller, multiple first battery modules, a second battery module and a connection switching module. Each first battery module includes a first battery and a thermoelectric unit. The multiple first battery modules and the second battery module supply power to high-voltage equipment and low-voltage equipment, respectively. Connection ends of the multiple thermoelectric units are connected to the connection switching module. When the first batteries are discharging, the controller controls the connection switching module to make the thermoelectric units connected in series between the two series connection ends for supplying electric energy to the second connection end of the second battery module. The thermoelectric unit converts the thermal energy generated by the first battery and provides it to the low-voltage device, thereby reducing the electrical energy that the second battery module outputs and improving energy utilization efficiency.

10 Claims, 6 Drawing Sheets

(56) References Cited

U.S. PATENT DOCUMENTS

| | | |
|---|---|---|
| 7,014,945 B2 | 3/2006 | Moores, Jr. et al. |
| 7,056,616 B2 | 6/2006 | Moores, Jr. et al. |
| 7,061,208 B2 | 6/2006 | Nishihata et al. |
| 7,230,404 B2 | 6/2007 | Kimoto et al. |
| 7,252,904 B2 | 8/2007 | Moores, Jr. et al. |
| 7,270,910 B2 | 9/2007 | Yahnker et al. |
| 7,326,490 B2 | 2/2008 | Moores, Jr. et al. |
| 7,384,704 B2 | 6/2008 | Scott |
| 7,649,139 B2 | 1/2010 | Mihara et al. |
| 7,736,792 B2 | 6/2010 | Moores, Jr. et al. |
| 7,777,445 B2 | 8/2010 | Uchiyama et al. |
| 7,939,193 B2 | 5/2011 | Moores, Jr. et al. |
| 7,968,223 B2 | 6/2011 | Lee et al. |
| 8,080,326 B2 | 12/2011 | Chan et al. |
| 8,330,416 B2 | 12/2012 | Goma |
| 8,658,299 B2 | 2/2014 | Yang et al. |
| 8,692,506 B2 | 4/2014 | Saito et al. |
| 8,734,977 B2 | 5/2014 | Lee et al. |
| 8,830,676 B2 | 9/2014 | Borck et al. |
| 8,841,015 B2 | 9/2014 | Yoon |
| 8,924,056 B2 | 12/2014 | Chorian et al. |
| 8,974,942 B2 | 3/2015 | Bell et al. |
| 9,114,181 B2 | 8/2015 | Stoddard et al. |
| 9,265,847 B2 | 2/2016 | Stoddard et al. |
| 9,312,580 B2 | 4/2016 | Nguyen et al. |
| 9,564,571 B2 | 2/2017 | Cheng et al. |
| 9,590,282 B2 | 3/2017 | Kossakovski et al. |
| 9,620,827 B2 | 4/2017 | Houchin-Miller et al. |
| 9,627,725 B2 | 4/2017 | Merriman et al. |
| 9,666,914 B2 | 5/2017 | Bell et al. |
| 10,236,547 B2 | 3/2019 | Kossakovski et al. |
| 10,270,141 B2 | 4/2019 | Piggott et al. |
| 10,361,577 B2 | 7/2019 | Gleason et al. |
| 2002/0034682 A1 | 3/2002 | Moores, Jr. et al. |
| 2002/0197527 A1 | 12/2002 | Moores, Jr. et al. |
| 2003/0027037 A1 | 2/2003 | Moores, Jr. et al. |
| 2003/0064283 A1 | 4/2003 | Uemoto et al. |
| 2004/0086780 A1 | 5/2004 | Ebermann |
| 2004/0135550 A1 | 7/2004 | Nishihata et al. |
| 2004/0174138 A1 | 9/2004 | Moores, Jr. et al. |
| 2004/0175610 A1 | 9/2004 | Moores, Jr. et al. |
| 2005/0133206 A1 | 6/2005 | Scott |
| 2005/0202310 A1 | 9/2005 | Yahnker et al. |
| 2006/0110656 A1 | 5/2006 | Moores, Jr. et al. |
| 2006/0216583 A1 | 9/2006 | Lee et al. |
| 2007/0128505 A9 | 6/2007 | Yahnker et al. |
| 2007/0144573 A1 | 6/2007 | Mihara et al. |
| 2008/0003491 A1 | 1/2008 | Yahnker et al. |
| 2008/0087315 A1 | 4/2008 | Deming et al. |
| 2008/0102355 A1 | 5/2008 | Moores, Jr. et al. |
| 2008/0268333 A1 | 10/2008 | Barrella et al. |
| 2009/0284230 A1 | 11/2009 | Goma |
| 2011/0082607 A1 | 4/2011 | Chorian et al. |
| 2011/0236731 A1 | 9/2011 | Bell et al. |
| 2011/0287285 A1 | 11/2011 | Yoon |
| 2012/0068668 A1 | 3/2012 | Kittell |
| 2012/0249060 A1 | 10/2012 | Stoddard et al. |
| 2012/0282497 A1 | 11/2012 | Yang et al. |
| 2012/0285758 A1 | 11/2012 | Bell et al. |
| 2013/0152560 A1 | 6/2013 | Hwang |
| 2013/0207617 A1 | 8/2013 | Houchin-Miller et al. |
| 2014/0009857 A1 | 1/2014 | Suzuki |
| 2014/0165597 A1 | 6/2014 | Hernon et al. |
| 2014/0311543 A1 | 10/2014 | Jinushi et al. |
| 2015/0000327 A1 | 1/2015 | Kakehashi et al. |
| 2015/0037649 A1 | 2/2015 | Wyatt et al. |
| 2015/0037662 A1 | 2/2015 | Pinon et al. |
| 2015/0229011 A1 | 8/2015 | Gless |
| 2015/0244042 A1 | 8/2015 | Bell et al. |
| 2015/0333246 A1 | 11/2015 | Lee et al. |
| 2015/0335772 A1 | 11/2015 | Stoddard et al. |
| 2015/0357692 A1 | 12/2015 | Piggott et al. |
| 2016/0149107 A1 | 5/2016 | Cheng et al. |
| 2016/0240903 A1 | 8/2016 | Kossakovski et al. |
| 2017/0214099 A1 | 7/2017 | Fleming et al. |
| 2017/0271728 A1 | 9/2017 | Kossakovski et al. |
| 2017/0294692 A1* | 10/2017 | Bell .................. H01M 10/653 |
| 2017/0338535 A1 | 11/2017 | Bhoir |
| 2017/0358831 A1 | 12/2017 | Milroy et al. |
| 2019/0252745 A1 | 8/2019 | Piggott et al. |
| 2019/0344670 A1* | 11/2019 | Mattmuller ............ B60L 50/90 |

\* cited by examiner

ELECTRIC ENERGY MANAGEMENT SYSTEM WITH THERMOELECTRIC POWER SUPPLY CONVERSION FUNCTION

BACKGROUND OF THE INVENTION

1. Field of the Invention

The present invention relates to an electric energy management system, in particular to an electric energy management system with thermoelectric power supply conversion function.

2. Description of the Prior Arts

Environmental protection and energy saving are one of the main trends of scientific and technological development in recent years. Therefore, rechargeable batteries that can be repeatedly charged and discharged are widely used in various daily appliances and industries, ranging from rechargeable batteries that meet the specifications of dry batteries, rechargeable razors and vacuum cleaners to electric motorcycles and electric vehicles. In order to meet the usage habits of general consumers and improve the convenience of such charging products, the charging efficiency and safety of rechargeable batteries are the key characteristics that must be considered and improved at the same time. The rechargeable battery made of any material has a battery temperature range for proper operation. When the battery temperature is higher or lower than the temperature range, it is not conducive to the charge and discharge of the rechargeable battery.

However, battery charging and discharging are accompanied with release of heat energy. When the charging/discharging speed is faster, the charging/discharging current is greater, and the rechargeable batteries generate a lot of heat that raises the battery temperature. If the heat generated is not dissipated in time, the temperature of the rechargeable battery rises to overheating during charging and discharging, resulting in the risk of battery destruction or even bursting and explosion. The waste heat generated by these rechargeable batteries not only raises the risk of damage to the batteries, but also raises the ambient temperature. In the prior art, active cooling and heat dissipation of the battery is commonly done, such as fans, thermoelectric elements, etc. However, additional electricity is required for heat exhaust, which is not conducive to energy efficiency.

In summary, the existing battery temperature management technology needs to be further improved.

SUMMARY OF THE INVENTION

In view of the above problems that the waste heat generated by charging and discharging of rechargeable batteries cannot be handled efficiently, the present invention provides an electrical energy management system with a thermoelectric power supply conversion function, comprising:
a controller;
multiple first battery modules, including:
a first battery having two first connection ends that are connected to a high-voltage device to supply power to the high-voltage device;
a thermoelectric unit having a first surface and a second surface opposite to each other, and having two connection ends; wherein the first battery is arranged on the first surface of the thermoelectric unit such that a surface of the first battery contacts the first surface of the thermoelectric unit;
a second battery module having two second connection ends that are connected to a low-voltage device to supply power to the low-voltage device;
a connection switching module electrically connected to the two connection ends of each thermoelectric unit and the controller, and having two series connection ends that are connected to the two second connection ends of the second battery module;
wherein, when the first batteries of the multiple first battery modules are in a discharging state, the controller controls the connection switching module to connect the thermoelectric units in series between the two series connection ends, so that the multiple thermoelectric units connected in series output electric energy to the second connection end.

The thermoelectric units of the present invention are thermoelectric coolers. Preferably, each thermoelectric unit is a semiconductor thermoelectric cooler chip. The thermoelectric cooler is made of two different thermoelectric materials. According to the principle of thermoelectric effect, when the first side and the second side have the heat generated by the environment, a potential difference is generated between the two connection ends of the thermoelectric unit. In contrast, when a voltage is provided to the second connection of the thermoelectric unit, a temperature difference is actively generated between the first and second surfaces of the thermoelectric unit to achieve the effect of cooling or heating.

In the power management system with thermoelectric power conversion function of the present invention, each first battery is arranged on a first side of a thermoelectric unit. The connection ends of each thermoelectric unit are connected to the connection ends of a connection switching module. The connection switching module can switch the connection status according to the control signal of the controller. In the discharging state, the first batteries of the multiple first battery modules generate heat and the temperature of the first side of each thermoelectric unit is higher than that of the second side facing the external environment, which results in a potential difference between the two connected ends of each thermoelectric unit. The controller controls the connection switching module to connect each thermoelectric connection in series, so that the potential difference generated by each thermoelectric unit is output in series from the two series connections to the second connection of the second battery module, and is output to the low-voltage device in parallel with the second battery module.

The thermoelectric units in the multiple first battery modules of the present invention convert the heat energy generated by the first battery into electrical energy, and the total output voltage can be improved by connecting the connection switching module in series. The total output voltage is provided to the second battery module as a parallel output, thereby reducing the load electrical energy to be output by the second battery module. With the thermoelectric conversion effect of the thermoelectric unit, the waste heat generated by the first batteries is effectively recovered and reused while keeping the first batteries normal, thereby improving the overall energy use efficiency of the power management system.

DETAILED DESCRIPTION OF THE PREFERRED EMBODIMENTS

Figure 1:
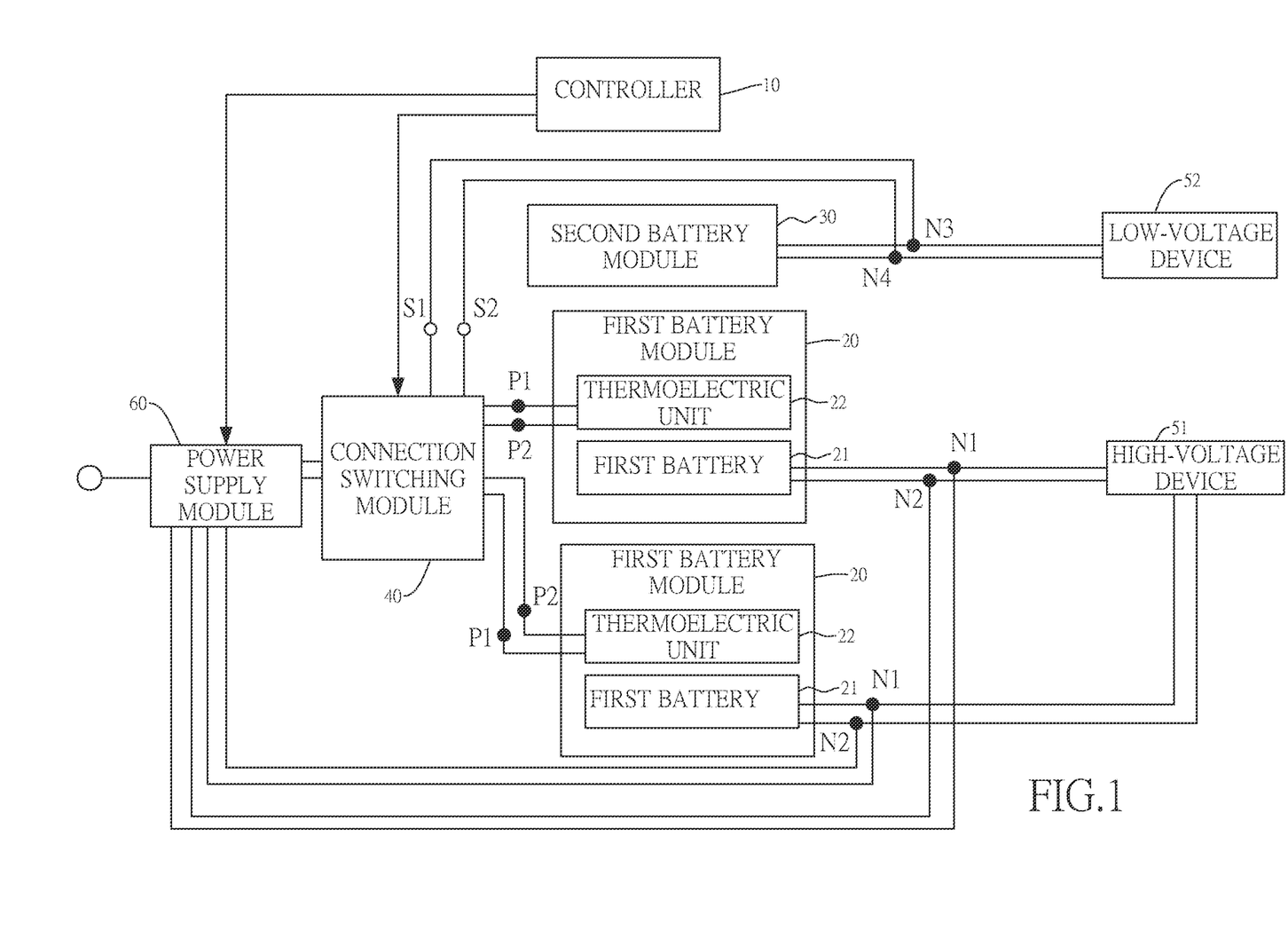
FIG. 1 is a block diagram of an electric energy management system with thermoelectric power supply conversion function according to the present invention.

Referring to FIG. 1, the power management system with thermoelectric power supply conversion function of the present invention mainly includes a controller 10, multiple first battery modules 20, a second battery module 30 and a connection switching module 40. The multiple first battery modules 20 respectively include a first battery 21 and a thermoelectric unit 22. Two first connection ends N1 and N2 of the first battery 21 are connected to a high-voltage device 51 to supply power to the high-voltage device 51. The thermoelectric unit 22 has a first surface 221 and a second surface 222 opposite to each other, and has two connection ends P1 and P2. The first battery 21 is disposed on the first surface 221 of the thermoelectric unit 22 to make a surface of the first battery 21 contact the first surface 221 of the thermoelectric unit 22. The second battery module 30 has two second connection ends N3 and N4, and the two second connection ends N3 and N4 are connected to a low-voltage device 52 to supply power to the low-voltage device 52.

The power management system with thermoelectric power supply conversion function of the present invention can be applied to a power supply system of an electric vehicle. The high-voltage device 51 requires a higher input voltage than the low-voltage device 52. The high-voltage device 51 can be, for example, a power motor of an electric vehicle, which requires an input voltage of 300 V to 400V. The low-voltage equipment 52 can be, for example, an electronic equipment other than the power motor on the electric vehicle, such as a lighting system, an instrument panel system, or audio equipment, etc., which requires an input voltage of 12V or 48V. Therefore, the first batteries 21 of the multiple first battery modules 20 are power batteries for supplying power to the multiple high-voltage devices 51. The multiple first batteries 21 can be, for example, connected in series to supply power to the high-voltage device 51. The second battery module 30 is another battery module in addition to the power batteries, such as a 12V battery, or a 48V output formed by multiple 12V batteries connected in series, but not limited to this.

The connection switching module 40 is electrically connected to the two connection ends P1, P2 of each thermoelectric unit 22 and the controller 10, and has two series connection ends S1, S2. The two series connection ends S1, S2 are connected to the two second connecting ends N3 and N4 of the second battery module 30. When the first batteries 21 of the multiple first battery modules 20 are in a discharging state, the controller 10 controls the connection switching module 40 to connect each of the connections ends P1, P2 in series between the two series connections S1, S2. So the multiple thermoelectric units 22 are connected in series through the connection switching module 40 and output electrical energy to the second connection ends N3, N4.

The discharging state of the multiple first battery modules 20 is a state in which the multiple first batteries 21 supply power to the high-voltage device 51 through the first connection ends N1 and N2. When the first battery generates heat by discharging and causes the surface temperature to rise, the temperature of the first surface 221 of the thermoelectric unit 22 is higher than the temperature of the second surface 222, so a potential difference is generated between the two connection ends P1 and P2 of the thermoelectric unit 22. At this time, the controller 10 controls the connection switching module 40 to connect the two connection ends P1 and P2 of the thermoelectric units 22 in series between the two series connection ends S1 and S2. In other words, the thermoelectric units 22 are connected in series, and the potential difference between the two series connection ends S1 and S2 is the sum of the potential differences of the thermoelectric units 22.

Figure 2:
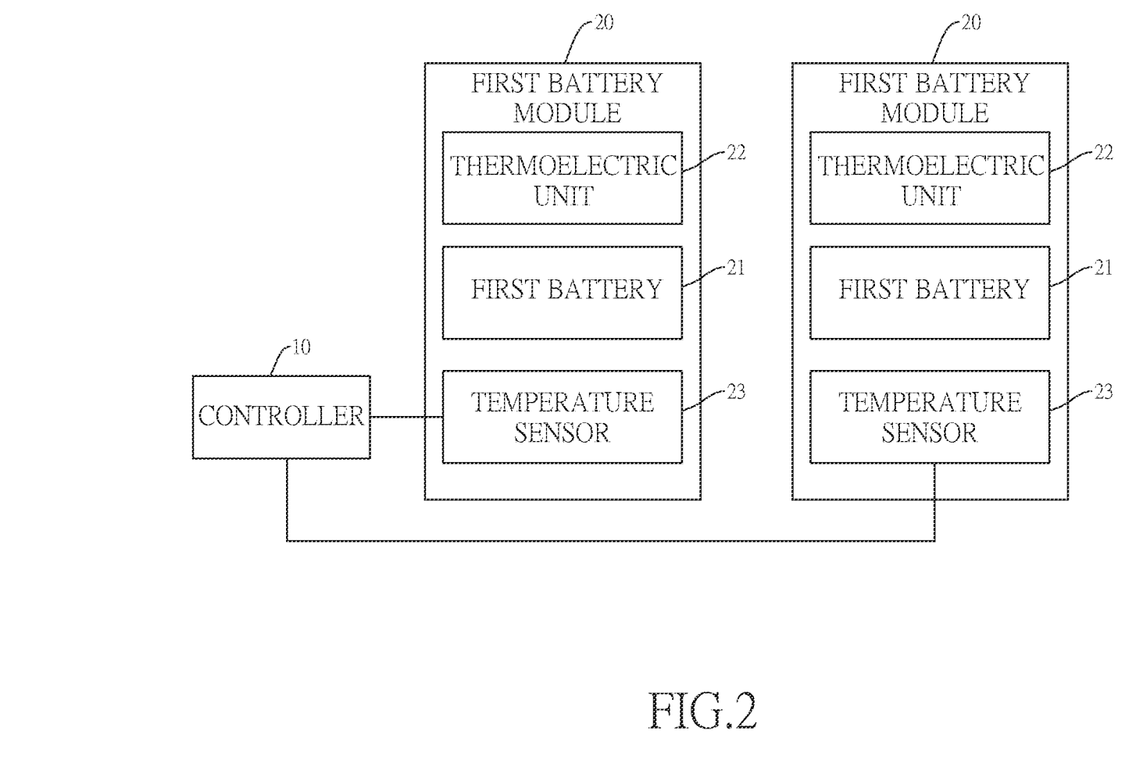
FIG. 2 is a partial block diagram of the present invention.

Referring to FIG. 2, in one embodiment, each of the first battery modules 20 further includes a temperature sensor 23 that is disposed on a temperature measuring surface of the first battery 21 and is electrically connected to the controller 10. The temperature sensor 23 generates a temperature sensing information according to a surface temperature of the temperature measuring surface of the first battery 21 and sends the temperature sensing information to the controller 10. When the first batteries 21 of the multiple first battery modules 20 are in the discharged state, the controller 10 first determines whether the surface temperatures of the multiple first batteries 21 is greater than a first threshold based on the temperature sensing information of the multiple temperature sensors 23. If the surface temperature of the multiples first batteries 21 is greater than the first threshold, the controller 10 controls the connection switching module 40 to connect the connection ends P1 and P2 of the thermoelectric units 22 in series between the two series connection ends S1 and S2.

Since the potential difference generated by the thermoelectric unit 22 is positively correlated with the temperature difference between the first surface 221 and the second surface 222, even if each of the thermoelectric units 22 is in the discharging state, the total potential difference generated by the multiple thermoelectric units 22 may be too low to be effectively utilized when the surface temperature of each of the first batteries 21 does not rise. Therefore, after confirming that the first battery modules 20 are in the discharging state, the controller 10 further determines that the surface temperature of the multiple first batteries 21 is greater than a first threshold before connecting the connection ends P1 and P2 of the multiple thermoelectric units 22 in series to output electrical energy to the second connection ends N3 and N4 via the connection switching module 40. In a preferred embodiment, the controller 10 calculates the average value of the surface temperature of each of the first batteries 21 based on the temperature sensing information of each of the temperature sensors 23. When the average value is greater than the first threshold, the controller 10 confirms that the surface temperature of the multiple first batteries 21 is greater than the first threshold.

Referring to FIG. 1, in an embodiment of the present invention, the power management system with thermoelectric power supply conversion function further comprises a power supply module 60 electrically connected to the connection switching module 40 and the first battery 21 of each of the first battery modules 20. The power supply module 60 is electrically connected to an external power source to receive an external voltage, then convert the external voltage to a charging voltage and a supply voltage. When the multiple first batteries 21 are in the charging state, the power module 60 provides the charging voltage to each of the first batteries 21 and provides the supply voltage to the connection switching module 40. The connection switching module 40 receives the supply voltage, and the controller 10 controls the connection switching module 40 to provide the supply voltage to each of the thermoelectric units 22 through the connection ends P1, P2

When the power supply module 60 provides a charging voltage to each of the first batteries 21 for charging, the power supply module 60 also provides a supply voltage to each of the thermoelectric units 22 through the connection switching module 40. According to the operating principle of the thermoelectric unit 22, when the two connection ends P1 and P2 of the thermoelectric unit 22 receive a voltage, the first surface 221 and the second surface 222 of the thermoelectric unit 22 actively generate a temperature difference. The temperature of the first surface 221 is higher or lower than the temperature of the second surface 222 depending on the positive or negative polarity of the voltage. For example, when the supply voltage is a first voltage, the temperature of the first surface 221 of the thermoelectric unit 22 is lower than the temperature of the second surface 222. When the supply voltage is a second voltage with the opposite polarity to the first voltage, the temperature of the first surface 221 of the thermoelectric unit 22 is higher than the temperature of the second surface 222. As the first battery 21 is arranged on the first surface 221 of the thermoelectric unit 22, when the temperature of the first surface 221 is lower than the temperature of the second surface 222, the thermoelectric unit 22 can cool down the first battery 21. Conversely, the thermoelectric unit 22 can heat the first battery 21. Thus, by controlling the power supply module 60 to provide supply voltage, the controller 10 can maintain a stable temperature of each first battery 21 while the power supply module 60 charges each first battery 21 according to the temperature information provided by the temperature sensor 23.

In an embodiment, when the first battery 21 of each of the first battery modules 20 is in a discharging state, the controller 10 determines whether the surface temperature of each of the first batteries 21 is greater than a second threshold based on the temperature sensing information of the multiple temperature sensors 23. If the surface temperature of one of the first batteries 21 is greater than the second threshold, the controller 10 determines that the first battery module 20 where the first battery 21 is located is in an over-temperature state. Then, the controller 10 controls the power supply module 60 to receive a battery voltage from the other first battery 21, provide the battery voltage to the connection switching module 40, and then control the connection switching module 40 to provide the battery voltage to the thermoelectric unit 22 of the first battery module 20 in the overtemperature state through the connection ends P1 and P2.

In this embodiment, the second threshold is greater than the first threshold. Each of the first batteries 21 has an upper normal temperature limit. When the surface temperature of any of the first batteries 21 is higher than the second threshold, it means that the first batteries 21 are in an abnormal over-temperature state. Therefore, the controller 10 receives the battery voltage of the other (non-over-temperature) first battery 21 by the power supply module 60, and provides the battery voltage to the thermoelectric unit of the over-temperature first battery module 20 through the connection switching module 40, so that the thermoelectric unit 22 of the over-temperature first battery module 20 cools down the first battery 21 in the over-temperature state, and the temperature of the first battery 21 in the over-temperature state does not continue to rise abnormally, thereby ensuring the safety of the battery.

Figure 3:
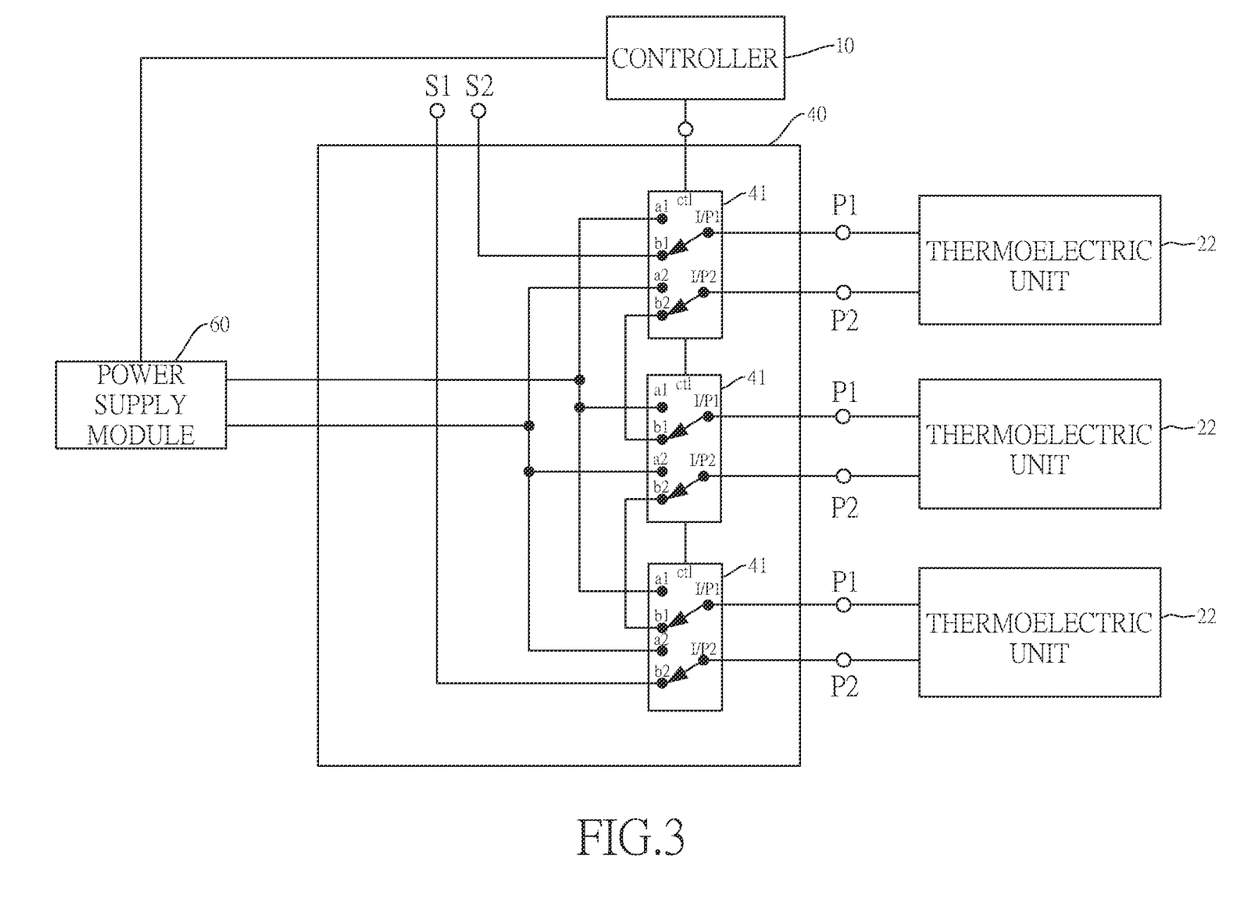
FIG. 3 is a schematic diagram illustrating the connection of the connection switching module of the present invention.

Referring to FIG. 3, preferably, the connection switching module 40 comprises multiple switches 41. The number of the switches 41 is equal to the number of the first battery modules 20, that is, equal to the number of the thermoelectric units 22, so as to control the connection modes of the connection ends P1 and P2 of the thermoelectric units 22 respectively. Each switch 41 has a control end ct1, two inputs IP1, IP2, two parallel ends a1, a2 and two series ends b1, b2 respectively. The control end ct1 is connected to the controller 10 to receive control signals from the controller 10. In one embodiment, the control end ct1 of each switch 41 is connected to the controller 10 in a serial connection to transmit the control signals from the controller 10. The two inputs IP1 and IP2 are connected to the two connection ends P1 and P2 of one of the thermoelectric units 22. The two parallel ends a1 and a2 are connected to the power module 60 to receive the supply voltage or battery voltage from the power module 60. The series ends b1 and b2 of the multiple switches 41 are connected in series between the two series connection ends S1 and S2 of the connection switching module 40. Each switch 41 controls the two inputs IP1 and IP2 to be electrically connected to the two parallel ends a1 and a2 or the two series ends b1 and b2 based on the control signal of the controller 10. In an embodiment, the switch 41 can also prevent the two input ends IP1 and IP2 from connecting the parallel ends a1, a2 or the series ends b1, b2, and the thermoelectric unit 22 connected to the input terminals IP1, IP2 of the switch 41 cannot receive or input a voltage.

When each first battery 21 is in the discharging state and the controller 10 controls the connection switching module 40 to connect the connection ends P1 and P2 of each thermoelectric unit 22 in series between the two series connection ends S1 and S2, the controller 10 generates a control signal that controls each of the switches 41 to connect the inputs IP1 and IP2 to the series ends b1 and b2. Then the two connection ends P1, P2 of each thermoelectric unit 22 are connected in series between the two series connection ends S1 and S2 of the switching module 40. That is, each of the thermoelectric units 22 is connected in series between the two series connection ends S1 and S2 to output electric energy to the two connection ends P1 and P2.

Further, when each of the first batteries 21 is in the discharging state and the controller 10 determines that one of the first battery modules 20 is in the over-temperature state, the controller 10 sends a designated cooling control signal to the control end ct1 of each switch 41 of the connection switching module 40, which can make the switch 41 connected to the thermoelectric unit 22 of the first battery module 20 in the over-temperature state connect the inputs IP1 and IP2 to the parallel ends a1 and a2. At this time, the power module 60 provides the battery voltage of the first battery 21 in the non-over-temperature state to the two parallel ends a1, a2, so that the thermoelectric unit 22 of the first battery module 20 in the over-temperature state receives the battery voltage to cool down the first battery 21 in the over-temperature state.

When each of the first batteries 21 is in the charging state, the controller 10 controls each of the switches 41 to connect the inputs IP1 and IP2 to the parallel ends a1 and a2. At this time, the power supply module 60 provides the supply voltage to the parallel ends of the switches 41, so that each thermoelectric unit 22 receives the supply voltage to cool down or heat each first battery 21. In an embodiment, when in the charging state, the controller 10 can determine that the surface temperature of each of the first batteries 21 is higher or lower than an optimal temperature based on the multiple temperature sensing information. If the surface temperature of each of the first batteries 21 is higher than the optimal temperature, it means that each of the first batteries 21 needs to be cooled down, and then the power module 60 is controlled to provide the first voltage. If the surface temperature of each of the first batteries 21 is lower than the optimal temperature, it means that each of the first batteries 21 needs to be heated up, and then the power module 60 is controlled to provide the second voltage.

Figure 4:
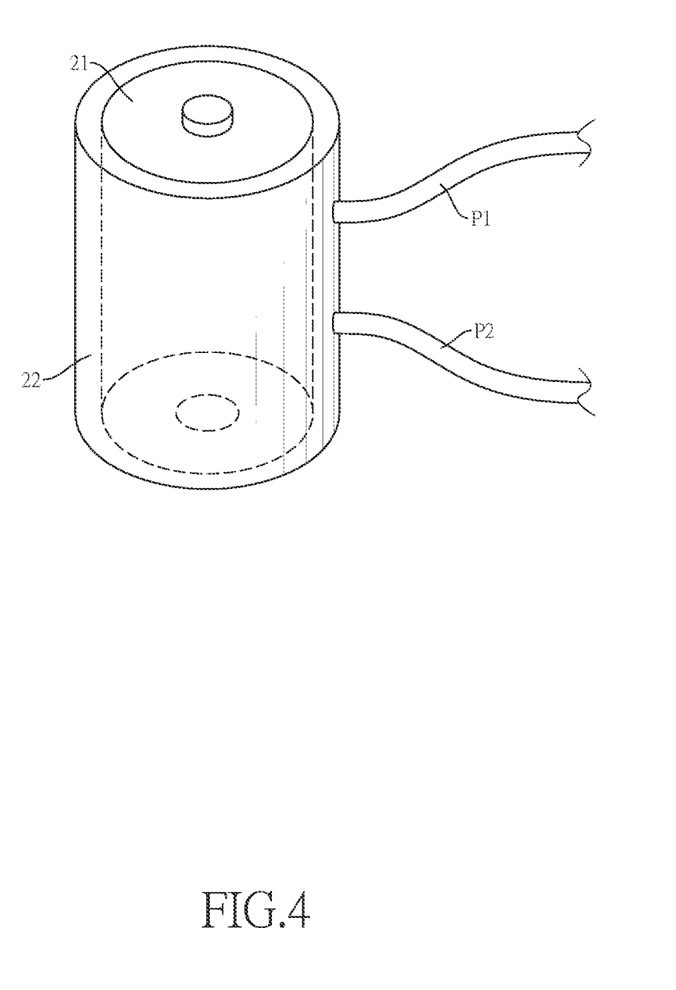
FIG. 4 is a perspective view of the first battery module in the power management system of the present invention.
Figure 5:
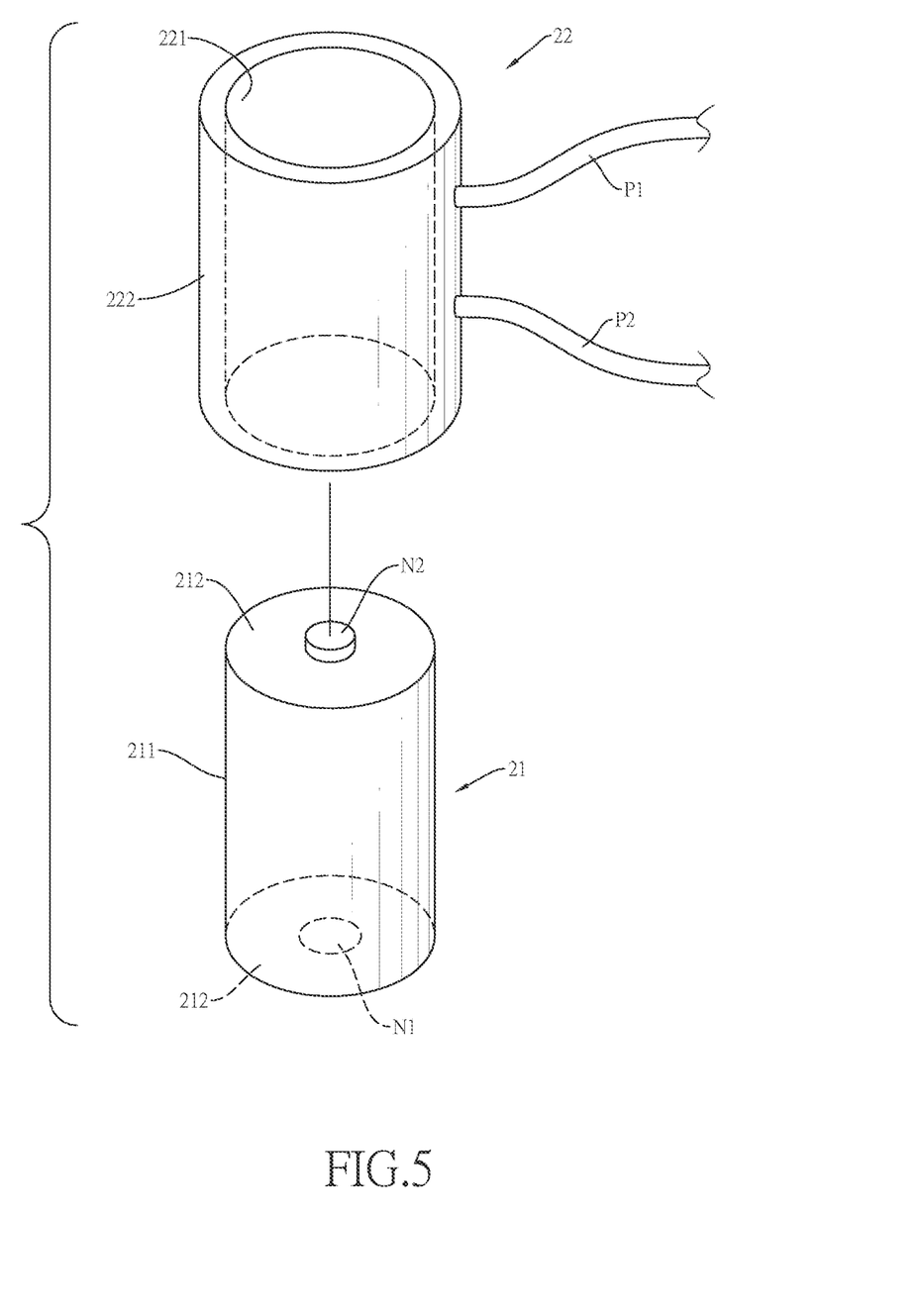
FIG. 5 is an exploded perspective view of the first battery module of the present invention.

Referring to FIG. 4 and FIG. 5, in an embodiment of the present invention, the multiple first batteries 21 are cylindrical batteries, and each first battery 21 has a side surface 211 and two end portions 212. The two end portions 212 are respectively disposed on opposite ends of the side surface 211, and the two first connecting ends N1 and N2 are formed on the two end portions 212 of the battery. Wherein, the first surface 221 of each thermoelectric unit 22 is attached to the side surface 211 of each cylindrical battery. Preferably, the multiple thermoelectric units 22 are flexible thin-film semiconductor thermoelectric cooling chips, that is, the multiple thermoelectric units 22 are flexible and bendable. Therefore, no matter whether the first battery 21 is a cylinder, a square column or a plate, the thermoelectric unit 22 can change its shape according to the surface of the first battery 21, so as to closely attach to the surface of the first battery 21, thereby achieving a better heat transfer efficiency.

Figure 6:
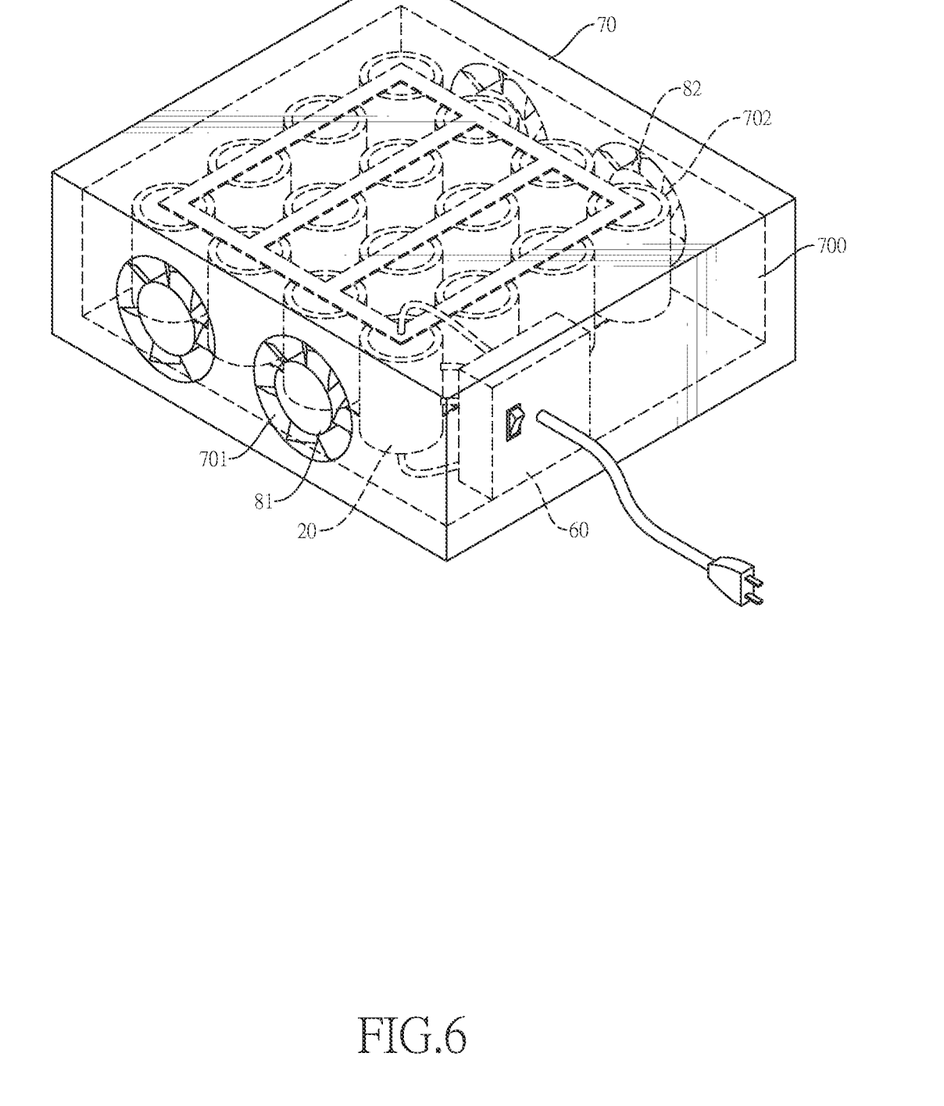
FIG. 6 is a perspective view of an electric energy management system with thermoelectric power supply conversion function of the present invention.

Further, as shown in FIG. 6, the power management system with thermoelectric power conversion function further comprises a housing 70. The housing 70 has a housing space 700, a first fan opening 701, and a second fan opening 702. The multiple first battery modules 20 and the power supply module 60 are provided in the housing space 700 of the housing 70. The first fan opening 701 is formed in one side of the housing 70, and the second fan opening 702 is formed in the other side of the housing 70 opposite to the first fan opening 701. Both the first fan opening 701 and the second fan opening 702 are connected to the housing space 700. The first fan device 81 exhausts air in the same direction of the second fan device 82. For example, the first fan device 81 exhausts air from the housing space 700 to the outside of the housing 70, and the second fan device 82 exhausts air from the outside into the housing space 700. Compared with the single-side fan device, the present invention further provides fan devices on both sides of the housing 70. When the thermoelectric unit 22 cools down the first battery 21 and the heat energy accumulates in the housing space 700 of the housing 70, the first fan device 81 and the second fan device 82 on both sides make the air flow quickly and discharge the waste heat out of the housing 70. In a preferred embodiment, the first fan device 81 and the second fan device 82 are digital frequency variable fans that have high speed and avoid excessive power consumption in heat extraction, thereby improving energy efficiency.

In summary, in the electric energy management system with thermoelectric power conversion function of the present invention, the thermoelectric units 11 disposed on the surface of the first batteries 21 can effectively manage the thermal energy generated by the first batteries 21, actively cool down the first batteries 21 or convert waste heat into electric energy within an appropriate range. When the system is connected to an external power source for charging, the power module can further cool down or heat the multiple first batteries 21 through the external power source. When the first batteries 21 are discharging, such as when an electric vehicle is running, the first battery module 20 can supply power to the power motor, the second battery module 30 can supply power to other first voltage devices, and the thermoelectric units 22 can convert the waste heat generated by the first batteries 21, and then are connected to the second battery module 30 to supply power to the low-voltage equipment. Then the waste heat is recovered for power supply to reduce the electric energy that the second battery module 30 needs to output. When one of the first batteries 21 is in an abnormal over-temperature state, the power of the other first batteries 21 can be used to cool down the over-temperature first battery 21 through the power module to ensure the safety of the electrical energy system.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An electric energy management system with thermoelectric power supply conversion function, comprising:
   a controller;
   multiple first battery modules, including:
      a first battery having two first connection ends that are connected to a high-voltage device to supply power to the high-voltage device;
      a thermoelectric unit having a first surface and a second surface opposite to each other, and having two connection ends; wherein the first battery is arranged on the first surface of the thermoelectric unit such that a surface of the first battery contacts the first surface of the thermoelectric unit;
   a second battery module having two second connection ends that are connected to a low-voltage device to supply power to the low-voltage device;
   a connection switching module electrically connected to the two connection ends of each thermoelectric unit and the controller, and having two series connection ends that are connected to the two second connection ends of the second battery module;
   wherein, when the first batteries of the multiple first battery modules are in a discharging state, the controller controls the connection switching module to connect the thermoelectric units in series between the two series connection ends, such that the multiple thermoelectric units connected in series output electric energy to the second connection ends.

2. The electric energy management system as claimed in claim 1, wherein each first battery module further includes:
   a temperature sensor arranged on a temperature measuring surface of the first battery, wherein the temperature sensor generates a temperature sensing information based on a surface temperature of the temperature measuring surface and sends the temperature sensing information to the controller;
   wherein, when the first batteries of the multiple first battery modules are in the discharging state, the controller first determines whether the surface temperature of the multiple first batteries is greater than a first threshold based on the temperature sensing information of the multiple temperature sensors;
   if the surface temperature of the multiple first batteries is greater than the first threshold, the controller controls the connection switching module to connect the connection ends of each thermoelectric unit in series between the two series connection ends.

3. The electric energy management system as claimed in claim 1, further comprising:
a power module electrically connected to the connection switching module, the first battery of each of the first battery modules, and electrically connected to an external power source to receive an external voltage and converting the external voltage to a charging voltage and a supply voltage;
wherein when the multiple first batteries are in a charging state, the power module provides the charging voltage to each of the first batteries and provides the supply voltage to the connection switching module; and the controller controls the connection switching module to provide the supply voltage to each of the thermoelectric units through the connection ends of the thermoelectric units.

4. The electric energy management system as claimed in claim 3, wherein:
when the first batteries of the multiple first battery modules are in the discharging state, the controller determines whether the surface temperature of each of the first batteries is greater than a second threshold based on the temperature sensing information of the multiple temperature sensors;
if the surface temperature of one of the first batteries is greater than the second threshold, the controller determines that the first battery module in which the first battery is located is in an over-temperature state; and the controller controls the power module to receive a battery voltage of another first battery, provides the battery voltage to the connection switching module, and controls the connection switching module to provide the battery voltage to the thermoelectric unit of the first battery module in the over-temperature state through the connection ends;
wherein the second threshold is greater than the first threshold.

5. The electric energy management system as claimed in claim 4, wherein the connection switching module further includes:
multiple switches, each having:
a control end connected to the controller;
two inputs connected to the two connection ends of one of the thermoelectric units;
two parallel ends connected to the power module to receive the supply voltage or the battery voltage; and
two series ends connected in series between the series connection ends;
wherein each of the switches controls the two inputs to be electrically connected to the two parallel ends or the two series ends based on a control signal of the controller.

6. The electric energy management system as claimed in claim 5, wherein when the first batteries of the multiple first battery modules are in the discharging state and the controller determines that one of the first battery modules is in the over-temperature state, the controller sends a designated cooling control signal to the control end of each switch of the connection switching module, such that the switch connected to the thermoelectric unit of the first battery module in the over-temperature state connects the two inputs to the parallel ends to make the thermoelectric unit of the first battery module in the over-temperature state receive the battery voltage.

7. The electric energy management system as claimed in claim 5, wherein when the first batteries of the multiple first battery modules are in the charging state, the controller sends a charging and cooling control signal to the control end of each switch of the connection switch module, such that each switch connects the two inputs to the parallel ends to make each thermoelectric unit receive the supply voltage.

8. The electric energy management system as claimed in claim 1, wherein the multiple first batteries are cylindrical batteries, each having:
two end portions and a side surface, wherein the two end portions are respectively disposed on opposite ends of the side surface; wherein the two first connection ends are respectively formed at the two ends of the first battery; the first surface of each thermoelectric unit is attached onto the side surface of each first battery.

9. The electric energy management system as claimed in claim 6, further comprising:
a housing including:
an accommodating space in which the multiple first battery modules and the power module are mounted;
a first fan opening formed in one side of the housing and communicating with the accommodating space;
a second fan opening formed in the other side of the housing opposite to the first fan opening and communicating with the accommodating space;
a first fan device arranged in the first fan opening;
a second fan device arranged in the second fan opening;
wherein exhaust directions of the first fan device and the second fan device are the same.

10. The electric energy management system as claimed in claim 1, wherein the multiple thermoelectric units have flexible thin film semiconductor thermoelectric cooling chips.

* * * * *